United States Patent
Sun

(10) Patent No.: US 11,878,938 B2
(45) Date of Patent: Jan. 23, 2024

(54) OPTICAL GLASS, GLASS PREFORM, OPTICAL ELEMENT AND OPTICAL INSTRUMENT HAVING THE SAME

(71) Applicant: CDGM GLASS CO., LTD., Sichuan (CN)

(72) Inventor: Wei Sun, Sichuan (CN)

(73) Assignee: CDGM GLASS CO., LTD., Sichuan (CN)

( * ) Notice: Subject to any disclaimer, the term of this patent is extended or adjusted under 35 U.S.C. 154(b) by 760 days.

(21) Appl. No.: 16/959,418

(22) PCT Filed: Aug. 17, 2018

(86) PCT No.: PCT/CN2018/101134
§ 371 (c)(1),
(2) Date: Jun. 30, 2020

(87) PCT Pub. No.: WO2020/034210
PCT Pub. Date: Feb. 20, 2020

(65) Prior Publication Data
US 2021/0070648 A1    Mar. 11, 2021

(51) Int. Cl.
*C03C 3/068* (2006.01)
(52) U.S. Cl.
CPC .................. *C03C 3/068* (2013.01)

(58) Field of Classification Search
CPC ........................................... C03C 3/068
See application file for complete search history.

(56) References Cited

U.S. PATENT DOCUMENTS

| 2008/0287280 | A1 | 11/2008 | Onoda et al. | |
| 2018/0222786 | A1* | 8/2018 | Sun | C03C 3/068 |
| 2018/0230038 | A1* | 8/2018 | Sun | C03C 3/068 |
| 2021/0309559 | A1* | 10/2021 | Sun | C03C 3/068 |
| 2021/0309560 | A1* | 10/2021 | Sun | G02B 1/00 |

FOREIGN PATENT DOCUMENTS

| CN | 101397187 A | | 4/2009 |
| CN | 102030474 A | | 4/2011 |
| CN | 102295409 A | | 12/2011 |
| CN | 102372430 A | * | 3/2012 |
| CN | 105198206 A | | 12/2015 |
| CN | 105293897 A | | 2/2016 |
| JP | 2013014454 A | * | 1/2013 |

* cited by examiner

Primary Examiner — Elizabeth A. Bolden
(74) Attorney, Agent, or Firm — NKL Law; Allen Xue

(57) ABSTRACT

Disclosed are an optical glass, a glass preform, an optical element and an optical instrument having the same. The optical glass comprises 5 to 25 wt % of $B_2O_3$, 25 to 45 wt % of $La_2O_3$, 0 to 10 Wt % of $Y_2O_3$, 10 to 35 wt % of $Gd_2O_3$, 0.5 to 15 wt % of $SiO_2$, 1 to 15 wt % of $ZrO_2$, 0 to 5 wt % of $TiO_2$, 0 to 7 wt % of $WO_3$, 0 to 15 wt % of $Ta_2O_5$, 0 to 10 wt % of ZnO and 0 to 8.5 wt % of $Nb_2O_5$; and $m_{(B2O3+SiO2+ZrO2+Nb2O5+TiO2+WO3)}/m_{(La2O3+ZrO2)}$ is not lower than 0.6.

19 Claims, No Drawings

US 11,878,938 B2

OPTICAL GLASS, GLASS PREFORM, OPTICAL ELEMENT AND OPTICAL INSTRUMENT HAVING THE SAME

TECHNICAL FIELD

The present disclosure belongs to the field of optical glass, in particular the present disclosure relates to an optical glass, a glass preform, an optical element and an optical instrument having the same.

BACKGROUND

High-refractivity and low-dispersion optical glass can simplify optical systems, eliminate spherical aberration, chromatic aberration and image quality distortion, and expand visual field of lens, is significant to improve imaging quality of optical instruments, and enables lens to realize miniaturization and light weight, thus better meeting the requirements of novel optoelectronic products for high imaging quality. Especially, there is a great market demand for the high-refractivity and low-dispersion optical glass with refractive index (nd) greater than 1.86 and Abbe number (vd) greater than 38.8.

In general, a great amount of rare earth oxides are introduced to formula systems of the high-refractivity and low-dispersion glass to improve refractive index of glass. However, in different formula systems, excessive lanthanide oxides will affect glass forming ability, bringing difficulty to manufacturing by mass production process. Therefore, the optical glass composition of the prior art needs to be further explored.

DISCLOSURE

The present disclosure aims to solve one of the technical problems in the prior art to a certain extent. To this end, an object of the present disclosure is to propose an optical glass, a glass preform, an optical element and an optical instrument having the same, and the optical glass has a refractive index (nd) greater than 1.86 and an Abbe number (vd) greater than 38.8, thus solving such technical problems of high-refractivity and low-dispersion optical glass as easy devitrification, great difficulty in mass production and high cost in the prior art.

In one aspect of the present disclosure, the present disclosure proposes an optical glass. According to embodiments of the present disclosure, the optical glass comprises 5 to 25 wt % of $B_2O_3$, 25 to 45 wt % of $La_2O_3$, 0 to 10 wt % of $Y_2O_3$, 10 to 35 wt % of $Gd_2O_3$, 0.5 to 15 wt % of $SiO_2$, 1 to 15 wt % of $ZrO_2$, 0 to 5 wt % of $TiO_2$, 0 to 7 wt % of $WO_3$, 0 to 15 wt % of $Ta_2O_5$, 0 to 10 wt % of $ZnO$ and 0 to 8.5 wt % of $Nb_2O_5$, wherein $m_{(B2O3+SiO2+ZrO2+Nb2O5+TiO2+WO3)}/m_{(La2O3+ZrO2)}$ is not lower than 0.6.

The inventors find that by controlling components, contents and use ratio between specific components, the optical glass of the present disclosure is capable of resulting in high-refractivity and low-dispersion optical glass with devitrification resistance and excellent properties (optical glass with refractive index (nd) greater than 1.86, and Abbe number (vd) greater than 38.8) by using a little or no $Ta_2O_5$, and the optical glass of the present disclosure has low production cost and high availability for mass production.

In addition, the optical glass according to the embodiment of the present disclosure can also have the following additional technical features:

In some embodiments of the present disclosure, the optical glass comprises 8 to 20 wt % of $B_2O_3$, and/or 30 to 42 wt % of $La_2O_3$, and/or 0 to 8 wt % of $Y_2O_3$, and/or 15 to 28 wt % of $Gd_2O_3$, and/or 2 to 13 wt % of $SiO_2$, and/or 1 to 10 wt % of $ZrO_2$, and/or 0.1 to 5 wt % of $TiO_2$, and/or 0.1 to 5 Wt % of $WO_3$, and/or 0.5 to 10 wt % of $Ta_2O_5$, and/or 0 to 5 wt % of $ZnO$, and/or 0 to 8.5 wt % of $Nb_2O_5$. Hence, the optical glass can be ensured to have excellent properties.

In some embodiments of the present disclosure, the optical glass comprises 10 to 16 wt % of $B_2O_3$, and/or 33 to 39 wt % of $La_2O_3$, and/or 1 to 5 wt % of $Y_2O_3$, and/or 17 to 25 wt % of $Gd_2O_3$, and/or 4 to 10 wt % of $SiO_2$, and/or 3 to 8 wt % of $ZrO_2$, and/or 0.5 to 3 wt % of $TiO_2$, and/or 0.5 to 4 Wt % of $WO_3$, and/or 3 to 10 wt % of $Ta_2O_5$, and/or 1 to 3 wt % of $ZnO$, and/or 0 to 8.5 wt % of $Nb_2O_5$. Hence, the optical glass can be ensured to have excellent properties.

In some embodiments of the present disclosure, in the optical glass composition, $m_{(B2O3+SiO2+ZrO2+Nb2O5+TiO2+WO3)}/m_{(La2O3+ZrO2)}$ is not lower than 0.65, preferably 0.65 to 0.72. Hence, the optical glass can be further ensured to have excellent properties.

In some embodiments of the present disclosure, in the optical glass composition, $m_{(ZrO2+TiO2+La2O3)}/m_{(Nb2O5+SiO2+WO3+Gd2O3)}$ is equal b 1.0 to 1.6, preferably 1.1 to 1.45, and more preferably 1.35 to 1.42. Hence, the optical glass can be further ensured to have excellent properties.

In some embodiments of the present disclosure, the optical glass further comprises 0 to 1 wt % of $Sb_2O_3$, and/or 0 to 1 wt % of $SnO_2$, and/or 0 to 1 wt % of $CeO_2$, and/or 0 to 10 wt % of $Yb_2O_3$, and/or 0 to 10 wt % of $Lu_2O_3$, and/or 0 to 10 wt % of $Al_2O_3$, and/or 0 to 10 wt % of $Bi_2O_3$, and/or 0 to 10 wt % of $GeO_2$, and/or 0 to 10 wt % of total amount of $Li_2O$, $Na_2O$ and $K_2O$, and/or 0 to 10 wt % of total amount of $CaO$, $SrO$, $BaO$ and $MgO$. Hence, the optical glass can be further ensured to have excellent properties.

In some embodiments of the present disclosure, refractive index of the optical glass is greater than 1.86, preferably 1.87 to 1.89, and Abbe number thereof is greater than 38.8, preferably 39.0 to 41.0.

In some embodiments of the present disclosure, $\lambda_{70}$ of the optical glass is not greater than 420 nm, preferably not greater than 390 nm, and $\lambda_5$ thereof is not greater than 360 nm, preferably not greater than 350 nm.

In some embodiments of the present disclosure, an upper limit of devitrification temperature of the optical glass is not higher than 1350° C., preferably not higher than 1300° C.

In some embodiments of the present disclosure, durability of water of the optical glass is not lower than grade 3, preferably not lower than grade 2; durability of acid thereof is not lower than grade 3, preferably not lower than grade 2; and climatic resistance thereof is not lower than grade 3, preferably not lower than grade 2.

In some embodiments of the present disclosure, striae of the optical glass are above grade C, preferably above grade B, and more preferably above grade A.

In some embodiments of the present disclosure, extent of bubble of the optical glass is not lower than grade A, preferably not lower than grade $A_0$, and more preferably grade $A_{00}$.

In some embodiments of the present disclosure, density of the optical glass is not higher than 5.6 g/cm³, preferably not higher than 5.5 g/cm³.

In the second aspect of the present disclosure, the present disclosure proposes a glass preform. According to embodiments of the present disclosure, the glass preform is made of the optical glass. Hence, the glass preform made of the high-refractivity and high-dispersion optical glass has excellent properties, thus meeting the market demand.

In the third aspect of the present disclosure, the present disclosure proposes an optical element. According to embodiments of the present disclosure, the optical element is made of the optical glass or the glass preform. Hence, the optical element made of the high-refractivity and high-dispersion optical glass or the glass preform has excellent properties, thus meeting the market demand.

In the fourth aspect of the present disclosure, the present disclosure proposes an optical instrument. According to embodiments of the present disclosure, the optical instrument has the optical element. Hence, customer experience of the optical instrument can be improved by using the optical element with the excellent properties thereof.

Additional aspects and advantages of the present disclosure will be set forth in part in the description below and, in part, will become obvious from the description below, or can be learned by practice of the present disclosure.

DETAILED DESCRIPTION

Embodiments of the present disclosure are described in detail below. The embodiments described below are exemplary and aim to explain the present disclosure, and cannot be construed as limitations thereto.

In one aspect of the present disclosure, the present disclosure proposes an optical glass. According to embodiments of the present disclosure, the optical glass comprises 5 to 25 wt % of $B_2O_3$, 25 to 45 wt % of $La_2O_3$, 0 to 10 wt % of $Y_2O_3$, 10 to 35 wt % of $Gd_2O_3$, 0.5 to 15 wt % of $SiO_2$, 1 to 15 wt % of $ZrO_2$, 0 to 5 wt % of $TiO_2$, 0 to 7 wt % of $WO_3$, 0 to 15 wt % of $Ta_2O_5$, 0 to 10 wt % of ZnO and 0 to 8.5 wt % of $Nb_2O_5$, wherein $m_{(B2O3+SiO2+ZrO2+Nb2O5+TiO2+WO3)}/m_{(La2O3+ZrO2)}$ is not lower than 0.6.

Glass Composition:

$B_2O_3$ is a component to form skeleton of glass, and has functions of improving meltability and devitrification resistance and reducing dispersion of glass in the present disclosure. When introduced amount of $B_2O_3$ is more than 25 wt %, stability and refractive index of glass decrease; and when the introduced amount thereof is less than 5 wt %, the meltability of glass decreases, which cannot reach the optical constant required by the present disclosure. Therefore, in the present disclosure, $B_2O_3$ content is 5 to 25 wt %, preferably 8 to 20 wt %, and more preferably 10 to 16 wt %.

$La_2O_3$ is an indispensable component to obtain the optical properties required by the present disclosure. When $La_2O_3$ content is less than 25 wt %, it is difficult to realize the required optical properties, but when the content thereof is more than 45 wt %, the devitrification resistance and meltability of glass deteriorate. Therefore, in the present disclosure, the $La_2O_3$ content is 25 to 45 wt %, preferably 30 to 42 wt %, and more preferably 33 to 39 wt %.

$Y_2O_3$ can improve the meltability, devitrification resistance of glass and reduce upper limit of devitrification temperature of glass, but when content thereof is more than 10 wt %, the stability and devitrification resistance of glass decrease. Therefore, in the present disclosure, the $Y_2O_3$ content is 0 to 10 wt %, preferably 0 to 8 wt %, and more preferably 1 to 5 wt %.

In the present disclosure, $Gd_2O_3$ and $La_2O_3$ coexist, which can improve the stability of the formed glass. However, when $Gd_2O_3$ content is lower than 10 wt %, the effect is not obvious; and when the content thereof is more than 35 wt %, the devitrification resistance of glass decreases, and the stability of the formed glass deteriorates. Therefore, in the present disclosure, the $Gd_2O_3$ content is 10 to 35 wt %, preferably 15 to 28 wt %, and more preferably 17 to 25 wt %.

$SiO_2$ is a component to form skeleton of glass, and has functions of improving the devitrification resistance, climatic resistance and thermal stability of glass. However, when $SiO_2$ content is lower than 0.5 wt %, the function of improving the devitrification resistance is not obvious; and when the content thereof is more than 15 wt %, the meltability of glass decreases, and the refractive index required by the disclosure is not available. Therefore, in the present disclosure, the $SiO_2$ content is 0.5 to 15 wt %, preferably 2 to 13 wt %, and more preferably 4 to 10 wt %.

$ZrO_2$ is a component to improve the refractive index and stability, and has functions of improving the devitrification resistance and chemical durability due to the fact of forming glass as an intermediate oxide. When $ZrO_2$ content is less than 1 wt %, the intended effect is not available, and when the $ZrO_2$ content is more than 15 wt %, there is a tendency that devitrification tendency becomes strong and vitrification becomes difficult. Therefore, in the present disclosure, the $ZrO_2$ content is 1 to 15 wt %, preferably 1 to 10 wt %, and more preferably 3 to 8 wt %.

$TiO_2$ also has a function of increasing the refractive index of glass, and can involve formation of glass network, and appropriate introduction thereof can make glass stabler. However, when $TiO_2$ content is more than 5 wt %, dispersion of glass increases significantly, transmittance of short waves in the visible region of glass decreases, and tendency of coloring of glass increases. Therefore, in the present disclosure, the $TiO_2$ content is 0 to 5 wt %, preferably 0.1 to 5 wt %, and more preferably 0.5 to 3 wt %.

$WO_3$ plays the role of improving the refractive index. However, when the content thereof is more than 7 wt %, the dispersion increases significantly, the transmittance on the long side of short waves in the visible region of glass decreases, and the tendency of coloring of glass increases. Therefore, in the present disclosure, the $WO_3$ content is 0 to 7 wt %, preferably 0.1 to 5 wt %, and more preferably 0.5 to 4 wt %.

$Ta_2O_5$ has functions of improving the refractive index and maintaining low dispersion of glass. However, due to higher price than other components, when the content thereof is more than 15 wt %, cost of the optical glass increases. Therefore, usage of $Ta_2O_5$ is decreased in the perspective of utility and cost. In the present disclosure, the $Ta_2O_5$ content is 0 to 15 wt %, preferably 0.5 to 10 wt %, and more preferably 3 to 10 wt %.

ZnO can adjust the refractive index and dispersion of glass, and a proper amount of ZnO can play a role of improving the stability or meltability of glass and enhancing compressive formability. However, when ZnO content is more than 10 wt %, the refractive index decreases, failing to meet requirements of the present disclosure; and the devitrification resistance of glass decreases, and the upper limit of devitrification temperature rises. Therefore, in the present disclosure, the ZnO content is 0 to 10 wt %, preferably 0 to 5 wt %, and more preferably 1 to 3 wt %.

$Nb_2O_5$ is a high-refractivity and high-dispersion component and capable of increasing the refractive index without significantly increasing dispersion, and also has functions of improving anti-devitrification and chemical stability of glass. However, when $Nb_2O_5$ content is more than 8.5 wt %, the optical properties of the glass of the present disclosure cannot be obtained, and the devitrification resistance of glass deteriorates. Therefore, in the present disclosure, the $Nb_2O_5$ content is 0 to 8.5 wt %, preferably 0.

The inventors find that the optical glass of the present application requires excellent optical properties, devitrification resistance, chemical stability, climatic resistance, bubble grade and striae grade as well as low upper limit of devitrification temperature. Through a lot of researches, the inventors of the present application find that by controlling ratio of total weight of $B_2O_3$, $SiO_2$, $ZrO_2$, $Nb_2O_5$, $TiO_2$ and $WO_3$ in the glass composition to total weight of $La_2O_3$ and $ZrO_2$ to be not lower than 0.6 and making the components play a synergistic role, gas solubility can be effectively controlled during glass melting, the resulting glass is reluctant to devitrify, optical constant of the glass improves, the chemical stability and uniformity improve, so that the optical glass has the refractive index greater than 1.86, the Abbe number greater than 38.8, the upper limit of devitrification temperature not higher than 1350° C., the durability of water not lower than grade 3, the durability of acid not lower than grade 3, the climatic resistance not lower than grade 3, the striae above grade C, and the extent of bubble not lower than grade A, and the resulting optical glass has excellent devitrification resistance; and by further preferably controlling the ratio of the total weight of $B_2O_3$, $SiO_2$, $ZrO_2$, $Nb_2O_5$, $TiO_2$ and $WO_3$ to the total weight of $La_2O_3$ and $ZrO_2$ to be not lower than 0.65, more preferably 0.65 to 0.72, the resulting optical glass has the refractive index of 1.87 to 1.89, the Abbe number of 39.0 to 41.0, the upper limit of devitrification temperature not higher than 1300° C., the durability of water not lower than grade 2, the durability of acid not lower than grade 2, the climatic resistance not lower than grade 2, the striae above grade B, more preferably not lower than grade A, and the extent of bubble not lower than grade $A_0$, more preferably grade $A_{00}$.

The inventors also find that the optical glass of the present application further requires excellent transmittance and light-weight property. Through a lot of researches, the inventors of the present application find that by controlling ratio of total weight of $ZrO_2$, $TiO_2$ and $La_2O_3$ to total weight of $Nb_2O_5$, $SiO_2$, $WO_3$ and $Gd_2O_3$ to be 1.0 to 1.6, the gas solubility can be effectively controlled during melting, the transmittance and chemical stability of glass improve, light weight is realized, and the resulting optical glass has $\lambda_{70}$ not more than 420 nm, $\lambda_5$ not more than 360 nm, density not higher than 5.6 g/cm³, the durability of water not lower than grade 3, the durability of acid not lower than grade 3, and the extent of bubble not lower than grade A; and by further preferably controlling the ratio of the total weight of $ZrO_2$, $TiO_2$ and $La_2O_3$ to the total weight of $Nb_2O_5$, $SiO_2$, $WO_3$ and $Gd_2O_3$ to be 1.1 to 1.45, more preferably 1.35 to 1.42, the resulting optical glass has $\lambda_{70}$ not more than 390 nm, $\lambda_5$ not more than 350 nm, the density not higher than 5.5 g/cm³, the durability of water not lower than grade 2, the durability of acid not lower than grade 2, and the extent of bubble not lower than grade $A_0$, more preferably grade $A_{00}$.

According to a further embodiment of the present disclosure, the optical glass further comprises 0 to 1 wt % of $Sb_2O_3$, and/or 0 to 1 wt % of $SnO_2$, and/or 0 to 1 wt % of $CeO_2$, and/or 0 to 10 wt % of $Yb_2O_3$, and/or 0 to 10 wt % of $Lu_2O_3$, and/or 0 to 10 wt % of $Al_2O_3$, and/or 0 to 10 wt % of $Bi_2O_3$, and/or 0 to 10 wt % of $GeO_2$, and/or 0 to 10 wt % of total amount of $Li_2O$, $Na_2O$ and $K_2O$ and/or 0 to 10 wt % of total amount of CaO, SrO, BaO and MgO. The inventors find that addition of a small amount of $Sb_2O_3$ and/or $SnO_2$ and/or $CeO_2$ can improve clarification effect of glass, but when $Sb_2O_3$ content is more than 1 wt %, the glass has a tendency of clarification performance decrease, and strong oxidation action thereof promotes forming molds to deteriorate. Therefore, in the present disclosure, addition amount of $Sb_2O_3$ is preferably 0 to 1 wt %, more preferably 0 to 0.5 wt %, and further preferably 0. $SnO_2$ also can be added as a clarificant, but when content thereof is more than 1 wt %, the coloring of glass occurs, or when glass is subject to heating, softening and compression molding for secondary forming, Sn will become starting point of nucleation, generating a tendency of devitrification. Therefore, in the present disclosure, the $SnO_2$ content is preferably 0 to 1 wt %, more preferably 0 to 0.5 wt %, and further preferably 0. $CeO_2$ has the same function and addition proportion as $SnO_2$, and content thereof is preferably 0 to 1 wt %, more preferably 0 to 0.5 wt %, and further preferably 0. $Yb_2O_3$ is also a component having high refractive index and low dispersion in the glass of the present disclosure, when content thereof is more than 10 wt %, the stability and devitrification resistance of the glass decreases, therefore $Yb_2O_3$ content is preferably 0 to 10 wt %, more preferably 0 to 8 wt %, and further preferably 0. $Lu_2O_3$ can improve the refractive index and decrease the dispersion of glass, but when content thereof is more than 10 wt %, the devitrification resistance and meltability of glass deteriorate, and higher price thereof than other components result in increase in cost of the optical glass. Therefore, in the present disclosure, the $Lu_2O_3$ content is 0 to 10%, preferably 0 to 8 wt %, and more preferably 0. Introduction of a small amount of $Al_2O_3$ can improve the stability and chemical stability of the formed glass, but when the content thereof is more than 10 wt %, there is a tendency that the meltability of glass deteriorates and the devitrification resistance decreases. Therefore, in the present disclosure, the $Al_2O_3$ content is preferably 0 to 10 wt %, and more preferably 0 to 8 wt %. $Bi_2O_3$ can increase the refractive index of glass, but excessive addition thereof can lower transmittance on the long side of short waves in the visible region and shows a tendency of coloring of glass. Therefore, in the present disclosure, the $Bi_2O_3$ content is preferably 0 to 10 wt %, more preferably 0 to 5 wt %, and further preferably 0. $GeO_2$ also can effectively improve the stability and devitrification resistance of the formed glass. However, $GeO_2$ is very expensive, therefore, the $GeO_2$ content is preferably 0 to 10 wt %, more preferably 0 to 5 wt %, and further preferably 0. $Li_2O$, $Na_2O$ and $K_2O$ are components to inhibit phase splitting and improve the stability of glass. When the total content thereof is more than 10 wt %, there is a tendency of significantly decreasing the climatic resistance or decreasing the refractive index. Therefore, in the present disclosure, the total weight of $Li_2O$, $Na_2O$ and $K_2O$ is 0 to 10 wt %, more preferably 0 to 5 wt %, and further preferably 0. Such alkali-earth oxides as CaO, SrO, BaO and MgO can decrease the climatic resistance and significantly increase the upper limit of devitrification temperature of glass. However, when total content thereof is more than 10 wt %, the devitrification resistance of glass decreases. Therefore, in the present disclosure, the total weight of CaO, SrO, BaO and MgO is preferably 0 to 10 wt %, more preferably 0 to 5 wt %, and further preferably 0.

Properties and test methods of the optical glass of the present disclosure are described below.

1. Color code ($\lambda_{70}/\lambda_5$) Short wave transmission spectral characteristic of the glass of the present disclosure is expressed as Color code ($\lambda_{70}/\lambda_5$). $\lambda_{70}$ is the corresponding wavelength when the glass transmittance reaches 70%, $\lambda_5$ is the corresponding wavelength when the glass transmittance reaches 5%, and $\lambda_{70}$ is determined by measuring the wavelength with spectral transmittance in the wavelength domain from 280 nm to 700 nm and transmittance reaching 70% using two pieces of mutually parallel glass with thickness of optically polished relative planes being 10±0.1 mm. The spectral transmittance or transmittance is an amount indicated by $I_{out}/I_{in}$ in the case where light with intensity $I_{in}$ is incident perpendicularly to the surfaces of the glass, passes through the glass and emits light with intensity $I_{out}$ from a plane, and includes the transmittance of the surface reflection lost on the surfaces of the glass. The higher the refractive index of glass, the greater the surface reflection loss. Therefore, for the glass with high refractive index, low value of $\lambda_{70}$ means less self-coloring of glass. When the transmittance of the optical glass of the present disclosure reaches 70%, the corresponding wavelength ($\lambda_{70}$) is not more than 420 nm, preferably not more than 390 nm; and when the transmittance thereof reaches 5%, the corresponding wavelength ($\lambda_5$) is not more than 360 nm, preferably not more than 350 nm.

The spectral transmittance is measured by using a glass sample having a thickness of 10±0.1 mm with two opposing optically polished planes, and calculated on the basis of the result.

2. Density

Density of optical glass is the weight of unit volume at 20° C., and expressed in $g/cm^3$. The optical glass of the present disclosure has a density not higher than 5.6 $g/cm^3$, preferably not higher than 5.5 $g/cm^3$.

The density is measured according to the method specified in GB/T7962.20-2010.

3. Upper Limit of Devitrification Temperature The devitrification property of glass is measured by gradient furnace method which comprises the following steps: processing the glass into 180*10*10 mm samples, polishing sides, placing the samples into a furnace with temperature gradient (5° C./cm), raising temperature to 1400° C., taking out the samples after holding for 4 hours, naturally cooling to room temperature, and observing devitrification of the glass under a microscope, and the maximum temperature corresponding to appearance of crystals is the upper limit of devitrification temperature of glass. The lower the upper limit of devitrification temperature of glass, the stronger the stability of glass at high temperature, and the better the production process performance. According to a typical embodiment of the present disclosure, preferably, the upper limit of devitrification temperature of the optical glass is not higher than 1350° C., preferably not higher than 1300° C., and more preferably not higher than 1280° C.

4. Chemical Stability (Durability of Water ($D_W$) and Durability of Acid ($D_A$)

During manufacturing and use of optical glass elements, the ability of the polished surface of optical glass to resist action of erosive media such as water and acid is called chemical stability of optical glass, and the ability mainly depends on chemical composition of glass. The durability of water ($D_W$) (powder method) of the optical glass of the present disclosure is not lower than grade 3, preferably not lower than grade 2, and more preferably not lower than grade 1; and the durability of acid ($D_A$) thereof (powder method) is not lower than grade 3, preferably not lower than grade 2, and more preferably not lower than grade 1.

The durability of water ($D_W$) and the durability of acid ($D_A$) are tested according to the methods specified in GB/T 17129.

5. Bubble

The extent of bubble refers to grade of allowable bubble content of glass. Bubble affects appearance quality of glass products as well as optical properties, transparency and mechanical strength of optical glass, and causes a lot of adverse effects. Therefore, it is crucial to control the extent of bubble of glass. The optical glass of the present disclosure has the extent of bubble not lower than grade A, preferably not lower than grade $A_0$, and more preferably grade $A_{00}$.

The bubble quality of the optical glass is measured according to the method specified in GB/T7962.8-2010.

6. Refractive Index and Abbe Number

The optical glass of the present disclosure has high refractive index and low dispersion, and a lens made of the glass with high refractive index and low dispersion is generally combined with a lens made of glass with high refractive index and high dispersion to correct chromatic aberration. In addition, in the case that the optical glass is used as a lens, the higher the refractive index, the thinner the lens, which is conducive to miniaturization of optical equipment. For the optical glass of the present disclosure, the refractive index (nd) is more than 1.86, preferably nd is 1.87 to 1.89; and the Abbe number (vd) is more than 38.8, preferably vd is 39.0 to 41.0.

The refractive index and the Abbe number are measured according to the method specified in GB/T7962.1-2010.

7. Striae

For degree of striae, with a striae meter composed of a point light source and a lens, striae are viewed in the direction of maximum visibility, and compared with a standard sample. The striae are classified into 4 grades namely grade A, grade B, grade C and grade D. Grade A striae are invisible to the naked eye under specified testing conditions, grade B striae are fine and scattered striae under specified testing conditions, grade C striae are slight parallel striae under specified testing conditions, and grade D striae are rough striae under specified testing conditions. The striae of the optical glass of the present disclosure are above grade C, preferably above grade B, and more preferably grade A.

Striae are measured according to the method specified in MLL-G-174B.

8. Climatic resistance

Testing samples are placed in a testing box exposed to saturated water vapor atmosphere with relative humidity of 90%, temperature of the testing box alternates between 40° C. and 50° C. per hour, and the periodic change lasts for 15 times. Climatic resistance is categorized based on change in haze before and after testing, and haze refers to such degeneration layers as "fish eye" and "blushing" on the surface of colorless optical glass generated by atmospheric erosion. The degree of erosion on glass surface is determined by measuring difference in haze before and after erosion of the samples. The haze is measured by a turbidimeter with integrating sphere having relative deviation of haze indication within ±5%. The table below shows classification of climatic resistance:

| Category | 1 | 2 | 3 | 4 | | |
|---|---|---|---|---|---|---|
| | | | | a | b | c |
| Increase in haze, ΔH(%) | <0.3 | 0.3-1.0 | 1.0-2.0 | 2.0-4.0 | 4.0-6.0 | ≥6.0 |

The climatic resistance of the glass of the present disclosure is not lower than grade 3, preferably not lower than grade 2, and more preferably not lower than grade 1.

In the second aspect of the present disclosure, the present disclosure proposes a glass preform. According to embodiments of the present disclosure, the glass preform is made of the optical glass. Hence, the glass preform of the present disclosure has properties of high refractive index and low dispersion, thus meeting the market demand for high-performance glass. Specifically, the resulting optical glass is cut into predetermined size, uniformly coated with a release agent composed of boron nitride powder on the surface thereof, and heated, softened, and compression molded to make preforms for such lenses and prisms as concave meniscus lens, convex meniscus lens, biconvex lens, biconcave lens, plano-convex lens and plano-concave lens. It should be noted that the features and advantages described for theoptical glass also apply to the glass preform, and are not repeated here.

In the third aspect of the present disclosure, the present disclosure proposes an optical element. According to embodiments of the present disclosure, the optical element is made of the optical glass or the glass preform. Hence, the optical element of the present disclosure has properties of high refractive index and low dispersion, and can be made into such optical instruments as lenses and prisms with excellent properties at low cost. For example, when the optical element is used as a lens, the optical element can be used as convex meniscus lens, concave meniscus lens, biconvex lens, biconcave lens, plano-convex lens or plano-concave lens with lens face being spherical surface or aspheric surface. Such lens is combined with a lens made of glass with high refractive index and high dispersion to correct the chromatic aberration, and suitable for being as a lens for correcting chromatic aberration. In addition, such lens is also conducive to making compact optical systems. In addition, for prism, due to the high refractive index, a compact wide-angle optical system can be realized by combining the prism into an optical system and directing to the desired direction via a curved optical path. Specifically, the glass preform is annealed, and trimmed while reducing internal deformation of the glass so that optical properties such as the refractive index reach desired values, and then the preforms are milled and ground to make such lenses and prisms (i.e. optical elements) as concave meniscus lens, convex meniscus lens, biconvex lens, biconcave lens, plano-convex lens and plano-concave lens, and surfaces of the resulting optical elements can be coated with an anti-reflection film. It should be noted that the features and advantages described for the optical glass and the glass preform also apply to the optical element, and are not repeated here.

In the fourth aspect of the present disclosure, the present disclosure proposes an optical instrument. According to embodiments of the present disclosure, the optical instrument has the optical element. Hence, customer experience of the optical instrument can be improved by using the optical element with the excellent properties thereon. Specifically, the optical instrument of the present disclosure can be a digital camera or video camera. It should be noted that the features and advantages described for the optical element also apply to the optical instrument, and are not repeated here.

The present disclosure is described with reference to embodiments. It should be noted that the embodiments are descriptive only and do not limit the present disclosure in any way.

In order to obtain the glass with components shown in Table 1 to Table 5, carbonate, nitrate, hydroxides, oxides and boric acid are used as raw materials, the raw materials corresponding to the components of the optical glass are weighed proportionally and thoroughly mixed to obtain a blended raw material which is placed into a platinum crucible, heated to 1200 to 1450° C., melted, agitated and clarified to form uniform molten glass, and the molten glass is moderately cooled and poured into a preheated mold, kept at 650 to 700° C. for 2 to 4 hours and slowly cooled to obtain the optical glass. In addition, the properties of the glass are measured according to the above methods, and the measurement results are shown in Table 1 to Table 5.

TABLE 1

| Component (wt %) | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| $B_2O_3$ | 10.0 | 13.0 | 11.0 | 10.4 | 15.0 | 11.0 | 13.0 | 10.8 | 10.3 |
| $La_2O_3$ | 39.0 | 34.0 | 34.0 | 34.8 | 35.0 | 36.5 | 37.0 | 35.8 | 36.2 |
| $Y_2O_3$ | 0.0 | 5.0 | 5.0 | 4.6 | 5.0 | 3.2 | 2.5 | 5.0 | 4.5 |
| $Gd_2O_3$ | 14.0 | 23.0 | 21.0 | 23.0 | 20.0 | 23.0 | 22.0 | 22.8 | 19.0 |
| $SiO_2$ | 13.0 | 5.0 | 5.0 | 7.0 | 4.0 | 5.0 | 8.0 | 7.6 | 8.0 |
| $ZrO_2$ | 8.0 | 4.1 | 5.0 | 7.0 | 7.6 | 5.0 | 4.0 | 6.0 | 6.3 |
| $TiO_2$ | 0.1 | 1.9 | 3.0 | 3.0 | 0.0 | 3.0 | 1.0 | 2.7 | 1.0 |
| $WO_3$ | 7.0 | 1.0 | 4.0 | 2.2 | 5.0 | 4.0 | 1.0 | 1.0 | 4.0 |
| $Ta_2O_5$ | 1.8 | 10.0 | 9.0 | 7.0 | 0.5 | 7.0 | 8.5 | 7.3 | 7.8 |
| ZnO | 0.0 | 3.0 | 3.0 | 1.0 | 2.4 | 2.3 | 3.0 | 1.0 | 2.9 |
| $Nb_2O_5$ | 0.0 | 0.0 | 0.0 | 0.0 | 0.0 | 0.0 | 0.0 | 0.0 | 0.0 |
| $Sb_2O_3$ | 0.0 | 0.0 | 0.0 | 0.0 | 0.0 | 0.0 | 0.0 | 0.0 | 0.0 |
| $SnO_2$ | 1.0 | 0.0 | 0.0 | 0.0 | 0.5 | 0.0 | 0.0 | 0.0 | 0.0 |
| $CeO_2$ | 0.1 | 0.0 | 0.0 | 0.0 | 0.0 | 0.0 | 0.0 | 0.0 | 0.0 |
| $Yb_2O_3$ | 3.0 | 0.0 | 0.0 | 0.0 | 0.0 | 0.0 | 0.0 | 0.0 | 0.0 |
| $Lu_2O_3$ | 2.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 2.0 | 0.0 | 0.0 | 0.0 | 0.0 |
| $Bi_2O_3$ | 0.0 | 0.0 | 0.0 | 0.0 | 0.0 | 0.0 | 0.0 | 0.0 | 0.0 |
| $GeO_2$ | 0.0 | 0.0 | 0.0 | 0.0 | 0.0 | 0.0 | 0.0 | 0.0 | 0.0 |
| $Li_2O + Na_2O + K_2O$ | 1.0 | 0.0 | 0.0 | 0.0 | 0.0 | 0.0 | 0.0 | 0.0 | 0.0 |
| CaO + SrO + BaO + MgO | 0.0 | 0.0 | 0.0 | 0.0 | 3.0 | 0.0 | 0.0 | 0.0 | 0.0 |
| $(B_2O_3 + SiO_2 + ZrO_2 + Nb_2O_5 + TiO_2 + WO_3)/(La_2O_3 + ZrO_2)$ | 0.81 | 0.66 | 0.72 | 0.71 | 0.74 | 0.67 | 0.66 | 0.67 | 0.70 |
| $(ZrO_2 + TiO_2 + La_2O_3)/(Nb_2O_5 + SiO_2 + WO_3 + Gd_2O_3)$ | 1.39 | 1.38 | 1.40 | 1.39 | 1.47 | 1.39 | 1.35 | 1.42 | 1.40 |
| Total amount | 100 | 100 | 100 | 100 | 100 | 100 | 100 | 100 | 100 |
| Refractive index (nd) | 1.876 | 1.888 | 1.881 | 1.883 | 1.879 | 1.884 | 1.887 | 1.886 | 1.885 |

TABLE 1-continued

| Component (wt %) | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| Abbe number (vd) | 38.9 | 39.8 | 38.9 | 39.5 | 39.4 | 38.8 | 39.7 | 39.6 | 39.4 |
| Upper limit of devitrification temperature (° C.) | 1340 | 1270 | 1275 | 1280 | 1285 | 1275 | 1280 | 1275 | 1275 |
| Durability of water (grade) | 2 | 1 | 1 | 1 | 3 | 1 | 1 | 1 | 1 |
| Durability of acid (grade) | 3 | 1 | 1 | 1 | 3 | 1 | 1 | 1 | 1 |
| Bubble (grade) | $A_0$ | $A_{00}$ | $A_{00}$ | $A_{00}$ | $A_0$ | $A_{00}$ | $A_{00}$ | $A_{00}$ | $A_{00}$ |
| Striae (grade) | B | A | A | A | B | A | A | A | A |
| Climatic resistance (grade) | 2 | 1 | 1 | 1 | 3 | 1 | 1 | 1 | 1 |
| Density (g/cm³) | 5.465 | 5.467 | 5.464 | 5.465 | 5.560 | 5.465 | 5.470 | 5.460 | 5.464 |
| $\lambda_{70}$(nm) | 381 | 382 | 381 | 381 | 415 | 381 | 385 | 380 | 381 |
| $\lambda_5$(nm) | 342 | 343 | 342 | 342 | 358 | 342 | 345 | 340 | 342 |

TABLE 2

| Component (wt %) | Embodiment 10 | Embodiment 11 | Embodiment 12 | Embodiment 13 | Embodiment 14 | Embodiment 15 | Embodiment 16 | Embodiment 17 | Embodiment 18 |
|---|---|---|---|---|---|---|---|---|---|
| $B_2O_3$ | 25.0 | 11.0 | 10.0 | 11.0 | 11.8 | 13.4 | 13.0 | 12.4 | 11.1 |
| $La_2O_3$ | 42.0 | 37.0 | 35.0 | 33.0 | 33.1 | 45.0 | 34.1 | 35.0 | 35.4 |
| $Y_2O_3$ | 1.0 | 4.0 | 4.9 | 4.3 | 4.3 | 0.0 | 3.4 | 4.9 | 2.0 |
| $Gd_2O_3$ | 23.0 | 21.0 | 23.0 | 23.0 | 22.9 | 10.0 | 23.0 | 22.9 | 23.0 |
| $SiO_2$ | 2.0 | 7.9 | 7.0 | 6.9 | 6.0 | 15.0 | 6.3 | 5.6 | 5.0 |
| $ZrO_2$ | 1.0 | 4.0 | 6.0 | 7.0 | 6.5 | 3.0 | 4.2 | 5.0 | 6.5 |
| $TiO_2$ | 1.0 | 1.9 | 3.0 | 2.2 | 2.5 | 0.1 | 3.0 | 3.0 | 3.0 |
| $WO_3$ | 4.0 | 2.0 | 1.1 | 1.0 | 1.0 | 5.0 | 1.0 | 2.5 | 4.0 |
| $Ta_2O_5$ | 0.0 | 8.2 | 8.0 | 8.7 | 8.9 | 5.5 | 10.0 | 7.2 | 7.0 |
| ZnO | 0.0 | 3.0 | 2.0 | 2.9 | 3.0 | 1.0 | 2.0 | 1.5 | 3.0 |
| $Nb_2O_5$ | 0.0 | 0.0 | 0.0 | 0.0 | 0.0 | 0.0 | 0.0 | 0.0 | 0.0 |
| $Sb_2O_3$ | 0.0 | 0.0 | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 | 0.0 | 0.0 |
| $CeO_2$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $Lu_2O_3$ | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 |
| $Bi_2O_3$ | 0.0 | 0.0 | 0.0 | 0.0 | 0.0 | 0.0 | 0.0 | 0.0 | 0.0 |
| $GeO_2$ | 1.0 | 0.0 | 0.0 | 0.0 | 0.0 | 2.0 | 0.0 | 0.0 | 0.0 |
| $Li_2O + Na_2O + K_2O$ | 0.0 | 0.0 | 0.0 | 0.0 | 0.0 | 0.0 | 0.0 | 0.0 | 0.0 |
| $CaO + SrO + BaO + MgO$ | 0.0 | 0.0 | 0.0 | 0.0 | 0.0 | 0.0 | 0.0 | 0.0 | 0.0 |
| $(B_2O_3 + SiO_2 + ZrO_2 + Nb_2O_5 + TiO_2 + WO_3)/(La_2O_3 + ZrO_2)$ | 0.77 | 0.65 | 0.66 | 0.70 | 0.70 | 0.76 | 0.72 | 0.71 | 0.71 |
| $(ZrO_2 + TiO_2 + La_2O_3)/(Nb_2O_5 + SiO_2 + WO_3 + Gd_2O_3)$ | 1.52 | 1.39 | 1.41 | 1.37 | 1.41 | 1.60 | 1.36 | 1.39 | 1.40 |
| Total amount | 100 | 100 | 100 | 100 | 100 | 100 | 100 | 100 | 100 |
| Refractive index (nd) | 1.884 | 1.885 | 1.886 | 1.883 | 1.882 | 1.879 | 1.889 | 1.888 | 1.885 |
| Abbe number (vd) | 39.2 | 39.5 | 39.5 | 39.9 | 39.8 | 39.6 | 39.5 | 39.5 | 39.1 |
| Upper limit of devitrification temperature (° C.) | 1290 | 1275 | 1275 | 1285 | 1285 | 1320 | 1275 | 1280 | 1280 |
| Durability of water (grade) | 2 | 1 | 1 | 1 | 1 | 2 | 1 | 1 | 1 |
| Durability of acid (grade) | 2 | 1 | 1 | 1 | 1 | 2 | 1 | 1 | 1 |
| Bubble (grade) | $A_0$ | $A_{00}$ | $A_{00}$ | $A_{00}$ | $A_{00}$ | $A_0$ | $A_{00}$ | $A_{00}$ | $A_{00}$ |
| Striae (grade) | B | A | A | A | A | B | A | A | A |
| Climatic resistance (grade) | 2 | 1 | 1 | 1 | 1 | 2 | 1 | 1 | 1 |
| Density (g/cm³) | 5.520 | 5.465 | 5.462 | 5.468 | 5.462 | 5.600 | 5.469 | 5.465 | 5.464 |
| $\lambda_{70}$(nm) | 412 | 381 | 380 | 383 | 380 | 400 | 384 | 381 | 381 |
| $\lambda_5$(nm) | 355 | 342 | 341 | 343 | 341 | 351 | 344 | 342 | 342 |

TABLE 3

| Component (wt %) | Embodiment 19 | Embodiment 20 | Embodiment 21 | Embodiment 22 | Embodiment 23 | Embodiment 24 | Embodiment 25 | Embodiment 26 | Embodiment 27 |
|---|---|---|---|---|---|---|---|---|---|
| $B_2O_3$ | 14.0 | 16.0 | 13.0 | 12.0 | 13.0 | 12.0 | 14.0 | 14.0 | 10.0 |
| $La_2O_3$ | 37.0 | 45.0 | 33.8 | 35.1 | 37.0 | 37.0 | 37.0 | 35.8 | 39.0 |
| $Y_2O_3$ | 2.0 | 1.0 | 4.9 | 2.0 | 2.4 | 2.0 | 2.0 | 5.0 | 10.0 |
| $Gd_2O_3$ | 23.0 | 17.0 | 23.0 | 22.8 | 23.0 | 23.0 | 22.5 | 20.0 | 17.0 |
| $SiO_2$ | 5.0 | 15.0 | 5.8 | 5.4 | 5.0 | 6.0 | 6.0 | 5.0 | 10.0 |
| $ZrO_2$ | 4.0 | 1.0 | 4.5 | 6.8 | 6.5 | 5.6 | 6.5 | 4.0 | 7.0 |
| $TiO_2$ | 3.0 | 1.0 | 2.5 | 1.3 | 1.0 | 2.0 | 1.0 | 1.0 | 0.0 |
| $WO_3$ | 3.0 | 0.1 | 1.0 | 2.9 | 4.0 | 3.5 | 3.0 | 4.0 | 1.0 |
| $Ta_2O_5$ | 7.0 | 0.0 | 8.7 | 9.0 | 7.1 | 7.2 | 7.0 | 8.2 | 4.0 |
| ZnO | 2.0 | 3.9 | 2.8 | 2.7 | 1.0 | 1.7 | 1.0 | 3.0 | 0.0 |
| $Nb_2O_5$ | 0.0 | 0.0 | 0.0 | 0.0 | 0.0 | 0.0 | 0.0 | 0.0 | 2.0 |
| $Sb_2O_3$ | 0.0 | 0.0 | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 | 0.0 | 0.0 |
| $CeO_2$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $Lu_2O_3$ | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 |
| $Bi_2O_3$ | 0.0 | 0.0 | 0.0 | 0.0 | 0.0 | 0.0 | 0.0 | 0.0 | 0.0 |
| $GeO_2$ | 0.0 | 0.0 | 0.0 | 0.0 | 0.0 | 0.0 | 0.0 | 0.0 | 0.0 |
| $Li_2O + Na_2O + K_2O$ | 0.0 | 0.0 | 0.0 | 0.0 | 0.0 | 0.0 | 0.0 | 0.0 | 0.0 |
| $CaO + SrO + BaO + MgO$ | 0.0 | 0.0 | 0.0 | 0.0 | 0.0 | 0.0 | 0.0 | 0.0 | 0.0 |
| $(B_2O_3 + SiO_2 + ZrO_2 + Nb_2O_5 + TiO_2 + WO_3)/(La_2O_3 + ZrO_2)$ | 0.71 | 0.72 | 0.70 | 0.68 | 0.68 | 0.68 | 0.70 | 0.70 | 0.65 |
| $(ZrO_2 + TiO_2 + La_2O_3)/(Nb_2O_5 + SiO_2 + WO_3 + Gd_2O_3)$ | 1.42 | 1.46 | 1.37 | 1.39 | 1.39 | 1.37 | 1.41 | 1.41 | 1.53 |
| Total amount | 100 | 100 | 100 | 100 | 100 | 100 | 100 | 100 | 100 |
| Refractive index (nd) | 1.884 | 1.883 | 1.886 | 1.882 | 1.883 | 1.889 | 1.881 | 1.881 | 1.887 |
| Abbe number (vd) | 39.2 | 40.8 | 39.6 | 39.5 | 39.4 | 39.4 | 39.7 | 39.5 | 39.9 |
| Upper limit of devitrification temperature (° C.) | 1285 | 1275 | 1285 | 1275 | 1280 | 1280 | 1280 | 1280 | 1275 |
| Durability of water (grade) | 1 | 2 | 1 | 1 | 1 | 1 | 1 | 1 | 2 |
| Durability of acid (grade) | 1 | 2 | 1 | 1 | 1 | 1 | 1 | 1 | 2 |
| Bubble (grade) | $A_{00}$ | $A_0$ | $A_{00}$ | $A_{00}$ | $A_{00}$ | $A_{00}$ | $A_{00}$ | $A_{00}$ | $A_0$ |
| Striae (grade) | A | B | A | A | A | A | A | A | B |
| Climatic resistance (grade) | 1 | 2 | 1 | 1 | 1 | 1 | 1 | 1 | 2 |
| Density (g/cm³) | 5.460 | 5.510 | 5.468 | 5.465 | 5.465 | 5.468 | 5.462 | 5.462 | 5.520 |
| $\lambda_{70}$(nm) | 380 | 415 | 383 | 381 | 381 | 383 | 380 | 380 | 412 |
| $\lambda_5$(nm) | 340 | 358 | 343 | 342 | 342 | 343 | 341 | 341 | 355 |

TABLE 4

| Component (wt %) | Embodiment 28 | Embodiment 29 | Embodiment 30 | Embodiment 31 | Embodiment 32 | Embodiment 33 | Embodiment 34 | Comparative example 1 | Comparative example 2 |
|---|---|---|---|---|---|---|---|---|---|
| $B_2O_3$ | 10.5 | 15.0 | 16.0 | 10.0 | 20.0 | 8.0 | 18.0 | 15.0 | 5.0 |
| $La_2O_3$ | 42.0 | 39.0 | 33.0 | 30.0 | 45.0 | 45.0 | 35.0 | 45.0 | 40.0 |
| $Y_2O_3$ | 1.0 | 0.0 | 5.0 | 0.0 | 0.0 | 0.0 | 8.0 | 8.0 | 5.0 |
| $Gd_2O_3$ | 25.0 | 17.0 | 28.0 | 25.0 | 20.0 | 25.0 | 29.0 | 15.0 | 8.0 |
| $SiO_2$ | 4.0 | 10.0 | 0.5 | 10.0 | 3.0 | 15.0 | 0.5 | 10.0 | 5.0 |
| $ZrO_2$ | 10.0 | 3.0 | 1.0 | 15.0 | 1.0 | 1.0 | 7.0 | 0.0 | 5.0 |
| $TiO_2$ | 0.5 | 0.0 | 5.0 | 0.0 | 0.1 | 5.0 | 0.0 | 0.0 | 0.0 |
| $WO_3$ | 7.0 | 0.0 | 0.1 | 0.0 | 0.0 | 0.0 | 0.0 | 0.0 | 10.0 |
| $Ta_2O_5$ | 0.0 | 14.3 | 1.4 | 0.0 | 0.0 | 0.0 | 2.5 | 0.0 | 2.0 |
| ZnO | 0.0 | 1.7 | 10.0 | 10.0 | 2.4 | 1.0 | 0.0 | 7.0 | 20.0 |
| $Nb_2O_5$ | 0.0 | 0.0 | 0.0 | 0.0 | 8.5 | 0.0 | 0.0 | 0.0 | 0.0 |
| $Sb_2O_3$ | 0.0 | 0.0 | 0.0 | 0.0 | 0.0 | 0.0 | 0.0 | 0.0 | 0.0 |
| $SnO_2$ | 0.0 | 0.0 | 0.0 | 0.0 | 0.0 | 0.0 | 0.0 | 0.0 | 0.0 |
| $CeO_2$ | 0.0 | 0.0 | 0.0 | 0.0 | 0.0 | 0.0 | 0.0 | 0.0 | 0.0 |
| $Yb_2O_3$ | 0.0 | 0.0 | 0.0 | 0.0 | 0.0 | 0.0 | 0.0 | 0.0 | 0.0 |
| $Lu_2O_3$ | 0.0 | 0.0 | 0.0 | 0.0 | 0.0 | 0.0 | 0.0 | 0.0 | 0.0 |
| $Al_2O_3$ | 0.0 | 0.0 | 0.0 | 0.0 | 0.0 | 0.0 | 0.0 | 0.0 | 0.0 |
| $Bi_2O_3$ | 0.0 | 0.0 | 0.0 | 0.0 | 0.0 | 0.0 | 0.0 | 0.0 | 0.0 |
| $GeO_2$ | 0.0 | 0.0 | 0.0 | 0.0 | 0.0 | 0.0 | 0.0 | 0.0 | 0.0 |

TABLE 4-continued

| Component (wt %) | Embodiment 28 | Embodiment 29 | Embodiment 30 | Embodiment 31 | Embodiment 32 | Embodiment 33 | Embodiment 34 | Comparative example 1 | Comparative example 2 |
|---|---|---|---|---|---|---|---|---|---|
| $Li_2O + Na_2O + K_2O$ | 0.0 | 0.0 | 0.0 | 0.0 | 0.0 | 0.0 | 0.0 | 0.0 | 0.0 |
| $CaO + SrO + BaO + MgO$ | 0.0 | 0.0 | 0.0 | 0.0 | 0.0 | 0.0 | 0.0 | 0.0 | 0.0 |
| $(B_2O_3 + SiO_2 + ZrO_2 + Nb_2O_5 + TiO_2 + WO_3)/(La_2O_3 + ZrO_2)$ | 0.62 | 0.67 | 0.66 | 0.78 | 0.71 | 0.63 | 0.61 | 0.56 | 0.56 |
| $(ZrO_2 + TiO_2 + La_2O_3)/(Nb_2O_5 + SiO_2 + WO_3 + Gd_2O_3)$ | 1.46 | 1.56 | 1.36 | 1.29 | 1.46 | 1.28 | 1.42 | 1.80 | 1.96 |
| Total amount | 100 | 100 | 100 | 100 | 100 | 100 | 100 | 100 | 100 |
| Refractive index (nd) | 1.882 | 1.887 | 1.881 | 1.874 | 1.881 | 1.885 | 1.886 | 1.858 | 1.858 |
| Abbe number (vd) | 38.7 | 40.8 | 39.4 | 41.0 | 38.6 | 39.5 | 40.7 | 38.6 | 38.1 |
| Upper limit of devitrification temperature (° C.) | 1280 | 1275 | 1270 | 1285 | 1280 | 1295 | 1300 | 1352 | 1352 |
| Durability of water (grade) | 2 | 2 | 1 | 2 | 2 | 2 | 2 | 4 | 4 |
| Durability of acid (grade) | 2 | 2 | 1 | 2 | 2 | 2 | 2 | 4 | 4 |
| Bubble (grade) | $A_0$ | $A_0$ | $A_{00}$ | A | $A_0$ | $A_0$ | $A_0$ | B | B |
| Striae (grade) | B | B | A | B | B | B | B | D | D |
| Climatic resistance (grade) | 2 | 2 | 1 | 2 | 2 | 2 | 2 | 4 | 4 |
| Density (g/cm³) | 5.560 | 5.520 | 5.469 | 5.580 | 5.560 | 5.580 | 5.460 | 5.700 | 5.800 |
| $\lambda_{70}$(nm) | 415 | 410 | 384 | 387 | 415 | 387 | 380 | 440 | 442 |
| $\lambda_5$(nm) | 358 | 352 | 344 | 359 | 358 | 359 | 340 | 370 | 372 |

TABLE 5

| Component (wt %) | Comparative example 3 | Comparative example 4 | Comparative example 5 |
|---|---|---|---|
| $B_2O_3$ | 5.0 | 8.0 | 5.0 |
| $La_2O_3$ | 34.0 | 35.0 | 40.0 |
| $Y_2O_3$ | 10.0 | 0.0 | 0.0 |
| $Gd_2O_3$ | 40.0 | 35.0 | 30.0 |
| $SiO_2$ | 0.0 | 8.0 | 2.0 |
| $ZrO_2$ | 1.0 | 5.0 | 2.0 |
| $TiO_2$ | 0.0 | 2.0 | 0.0 |
| $WO_3$ | 10.0 | 0.0 | 13.0 |
| $Ta_2O_5$ | 0.0 | 0.0 | 2.0 |
| ZnO | 0.0 | 7.0 | 6.0 |
| $Nb_2O_5$ | 0.0 | 0.0 | 0.0 |
| $Sb_2O_3$ | 0.0 | 0.0 | 0.0 |
| $SnO_2$ | 0.0 | 0.0 | 0.0 |
| $CeO_2$ | 0.0 | 0.0 | 0.0 |
| $Yb_2O_3$ | 0.0 | 0.0 | 0.0 |
| $Lu_2O_3$ | 0.0 | 0.0 | 0.0 |
| $Al_2O_3$ | 0.0 | 0.0 | 0.0 |
| $Bi_2O_3$ | 0.0 | 0.0 | 0.0 |
| $GeO_2$ | 0.0 | 0.0 | 0.0 |
| $Li_2O + Na_2O + K_2O$ | 0.0 | 0.0 | 0.0 |
| $CaO + SrO + BaO + MgO$ | 0.0 | 0.0 | 0.0 |
| $(B_2O_3 + SiO_2 + ZrO_2 + Nb_2O_5 + TiO_2 + WO_3)/(La_2O_3 + ZrO_2)$ | 0.46 | 0.58 | 0.52 |
| $(ZrO_2 + TiO_2 + La_2O_3)/(Nb_2O_5 + SiO_2 + WO_3 + Gd_2O_3)$ | 0.70 | 0.98 | 0.93 |
| Total amount | 100 | 100 | 100 |
| Refractive index (nd) | 1.850 | 1.860 | 1.852 |
| Abbe number (vd) | 38.2 | 38.5 | 38.0 |
| Upper limit of devitrification temperature (° C.) | 1358 | 1350 | 1355 |
| Durability of water (grade) | 4 | 4 | 4 |
| Durability of acid (grade) | 4 | 4 | 4 |
| Bubble (grade) | B | B | B |
| Striae (grade) | D | D | D |
| Climatic resistance (grade) | 4 | 4 | 4 |
| Density (g/cm³) | 5.680 | 5.610 | 5.650 |
| $\lambda_{70}$(nm) | 431 | 430 | 435 |
| $\lambda_5$(nm) | 362 | 365 | 368 |

Note:
The total amounts (100%) in the tables are data obtained by deducting measurement errors, equipment accuracy and unavoidable impurities.

In the Description, the reference terms "one embodiment", "some embodiments", "example", "specific example", or "some examples", etc. are described to refer to that the specific features, structures, materials or characteristics described in combination with the embodiment or example are included in at least one embodiment or example of the present disclosure. In the Description, the illustrative expressions of the terms do not necessarily refer to the same embodiment or example. Moreover, the specific features, structures, materials or characteristics described can be appropriately combined in any one or more embodiments or examples. In addition, without any contradiction, those skilled in the art can integrate or combine different embodiments or examples or features of different embodiments or examples described in the Description.

Although the embodiments of the present disclosure have been illustrated and described, it can be understood that the embodiments are exemplary and should not be construed as limitations thereto. Changes, modifications, replacements and variations within the scope of the present disclosure can be made to the embodiments by any ordinary person skilled in the art.

The invention claimed is:
1. An optical glass, comprising:
5 to 25 wt % of $B_2O_3$;
25 to 45 wt % of $La_2O_3$;
0 to 10 wt % of $Y_2O_3$;

10 to 35 wt % of $Gd_2O_3$;
0.5 to 15 wt % of $SiO_2$;
1 to 15 wt % of $ZrO_2$;
0 to 5 wt % of $TiO_2$;
0 to 7 wt % of $WO_3$;
0 to 15 wt % of $Ta_2O_5$;
0 to 10 wt % of ZnO; and
0 to 8.5 wt % of $Nb_2O_5$,
wherein $m_{(B_2O_3+SiO_2+ZrO_2+Nb_2O_5+TiO_2+WO_3)}/m_{(La_2O_3+ZrO_2)}$ is not lower than 0.6 and not more than 0.7, and $m_{(ZrO_2+TiO_2+La_2O_3)}/m_{(Nb_2O_5+SiO_2+WO_3+Gd_2O_3)}$ ranges from 1.35 to 1.6.

2. The optical glass according to claim 1, further comprising:
8 to 20 wt % of $B_2O_3$; and/or
30 to 42 wt % of $La_2O_3$; and/or
0 to 8 wt % of $Y_2O_3$; and/or
15 to 28 wt % of $Gd_2O_3$; and/or
2 to 13 wt % of $SiO_2$; and/or
1 to 10 wt % of $ZrO_2$; and/or
0.1 to 5 wt % of $TiO_2$; and/or
0.1 to 5 wt % of $WO_3$; and/or
0.5 to 10 wt % of $Ta_2O_5$; and/or
0 to 5 wt % of ZnO; and/or 0 to 8.5 wt % of $Nb_2O_5$.

3. The optical glass according to claim 1, further comprising:
10 to 16 wt % of $B_2O_3$; and/or
33 to 39 wt % of $La_2O_3$; and/or
1 to 5 wt % of $Y_2O_3$; and/or
17 to 25 wt % of $Gd_2O_3$; and/or
4 to 10 wt % of $SiO_2$; and/or
3 to 8 wt % of $ZrO_2$; and/or
0.5 to 3 wt % of $TiO_2$; and/or
0.5 to 4 wt % of $WO_3$; and/or
3 to 10 wt % of $Ta_2O_5$; and/or
1 to 3 wt % of ZnO; and/or
0 to 8.5 wt % of $Nb_2O_5$.

4. The optical glass according to claim 1, further comprising:
0 to 1 wt % of $Sb_2O_3$; and/or
0 to 1 wt % of $SnO_2$; and/or
0 to 1 wt % of $CeO_2$; and/or
0 to 10 wt % of $YbO_3$; and/or
0 to 10 wt % of $Lu_2O_3$; and/or
0 to 10 wt % of $Al2O_3$; and/or
0 to 10 wt % of $Bi_2O_3$; and/or
0 to 10 wt % of $GeO_2$; and/or
0 to 10 wt % of total amount of $Li_2O$, $Na_2O$ and $K_2O$; and/or
0 to 10 wt % of total amount of CaO, SrO, BaO and MgO.

5. The optical glass according to claim 1, wherein $m_{(B_2O_3+SiO_2+ZrO_2+Nb_2O_5+TiO_2+WO_3)}/m_{(La_2O_3+ZrO_2)}$ ranges from 0.65 to 0.7.

6. The optical glass according to claim 1, wherein $m_{(ZrO_2+TiO_2+La_2O_3)}/m_{(Nb_2O_5+SiO_2+WO_3Gd_2O_3)}$ is equal to 1.35-1.45.

7. The optical glass according to claim 1, wherein $m_{(ZrO_2+TiO_2+La_2O_3)}/m_{(Nb_2O_5+SiO_2+WO_3+Gd_2O_3)}$ is equal to 1.35-1.42.

8. The optical glass according to claim 1, having
a refractive index of 1.87 to 1.89,
an abbe number of 39.0-41.0,
a $\lambda_{70}$ of not more than 390 nm,
a $\lambda_5$ of not more than 350 nm,
a devitrification temperature having an upper limit of not higher than 1300° C.,
a durability of water of not lower than grade 2,
a durability of acid of not lower than grade 2,
a climatic resistance is not lower than grade 2,
a striae of above grade A,
an extent of bubble of not lower than grade $A_{00}$, and
a density of not higher than 5.5 g/cm$^3$.

9. The optical glass according to claim 1, wherein a refractive index of the optical glass is more than 1.86, and abbe number thereof is more than 38.8.

10. The optical glass according to claim 1, wherein $\lambda_{70}$ of the optical glass is not more than 420 nm, and $\lambda_5$ thereof is not more than 360 nm.

11. The optical glass according to claim 1, wherein an upper limit of devitrification temperature of the optical glass is not higher than 1350° C.

12. The optical glass according to claim 1, wherein have a durability of water of not lower than grade 3, a durability of acid of not lower than grade 3, and a climatic resistance of not lower than grade 3.

13. The optical glass according to claim 1, wherein striae of the optical glass is above grade C.

14. The optical glass according to claim 1, wherein having an extent of bubble of not lower than grade A.

15. The optical glass according to claim 1, having a density of not higher than 5.6 g/cm$^3$.

16. A glass preform made of the optical glass according to claim 1.

17. An optical element made of the glass preform according to claim 16.

18. An optical element made of the optical glass according to claim 1.

19. An optical instrument with the optical element according to claim 18.

* * * * *